J. H. BRUMFIELD.
NUT LOCK.
APPLICATION FILED MAR. 29, 1915.
1,174,817.
Patented Mar. 7, 1916.
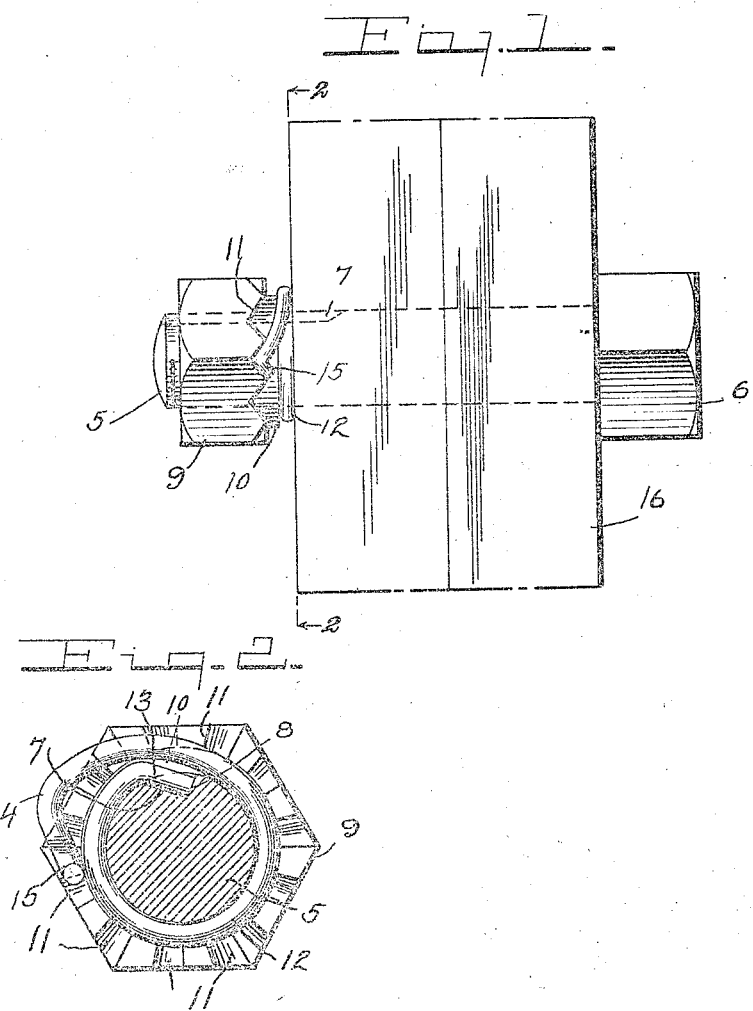

UNITED STATES PATENT OFFICE.

JAMES H. BRUMFIELD, OF CAMBRIA, VIRGINIA, ASSIGNOR OF ONE-HALF TO THOMAS A. SHEWEY, OF WAR EAGLE, WEST VIRGINIA.

NUT-LOCK.

1,174,817.  Specification of Letters Patent.  Patented Mar. 7, 1916.

Application filed March 29, 1915. Serial No. 17,770.

*To all whom it may concern:*

Be it known that I, JAMES H. BRUMFIELD, a citizen of the United States, residing at Cambria, in the county of Montgomery and State of Virginia, have invented certain new and useful Improvements in Nut-Locks; and I do hereby declare the following to be a full, clear, and exact description of the invention, such as will enable others skilled in the art to which it appertains to make and use the same.

This invention has for its object to provide a nut lock of simple and efficient construction embodying a locking member formed of spring material and having an angularly directed end adapted to engage teeth formed on the object engaging face of a nut to lock the latter against movement on the bolt.

Another object is the provision of a nut lock embodying a nut having an annular shoulder constituting an abutment for engaging the locking member to prevent the latter from being compressed to such an extent that the nut-engaging end thereof is secured against removal from the teeth formed on the nut.

With these and other objects in view, the invention consists in the novel construction, arrangement and formation of parts as will be hereinafter specifically described, claimed and illustrated in the accompanying drawing, in which:

Figure 1 represents a side elevation of the nut lock applied to use. Fig. 2 represents a transverse sectional view on the line 2—2 of Fig. 1.

Referring to the drawing in detail, wherein similar reference numerals designate corresponding parts throughout the several views, the numeral 5 indicates the shank of a bolt having a head 6 at one end and inwardly extending threads on the opposite end. A groove 7 is formed longitudinally of the shank 5 and is of V-shape having the radially disposed wall 8 adapted to be engaged by the inner angularly directed end of the locking member, to be hereinafter described, to lock the latter against rotation on the bolt.

The numeral 9 indicates the nut which is formed with the internally screwthreaded bore to receive the shank of the bolt 5 and an annular enlargement or shoulder 10 is formed on the inner or object-engaging face thereof. A plurality of projections or points 11 are formed radially of the inner face of the nut 9 outwardly of the annular shoulder 10.

The locking member designated generally by the numeral 12 is formed of spring metal and the body thereof is of substantially annular formation, the inner and outer ends 13 and 14, respectively, being overlapped. The body of the locking member 12 is of adequate diameter to snugly fit over the threaded shank of the bolt 5 and the inner extremity 13 thereof is directed inwardly for engagement within the V-shaped groove 7 and radial wall 8 thereof to prevent rotation of the locking member on the bolt. The opposite or outer end 14 of the locking member is bent angularly to provide a V-shaped member 15 adapted to engage between the projections or teeth 11 on the nut. The portion of the outer extremity of the locking member intermediate the body 12 and the angular end 15 is extended outwardly of the lateral faces of the nut to provide means whereby the angular end 15 may be withdrawn from the teeth or projections 11 to permit removal of the nut, when desired.

In use, the shank of the bolt 5 is positioned through the objects 16 to be bolted and the body 12 of the locking member is slipped over the bolt and engaged against one of the objects 16, and the inwardly directed end 13 thereof is engaged in the groove 7. The nut 9 is subsequently advanced upon the shank of the bolt by a wrench or other suitable tool until the annular shoulder or enlargement 10 firmly clamps the body of the locking member against the object 16, and the outer angularly directed extremity 15 of the locking member engages between the teeth or projections 11 and effectively locks the nut against rotation upon the bolt. As clearly illustrated in Fig. 1, the enlargement or shoulder 10 is of sufficient width to retain the teeth or projection 11 in spaced relation to the adjacent face of the object 16, whereby the outer extremity 15 of the locking member may be moved inwardly and disengaged from the teeth or projections to permit of the removal of the nut, when necessary.

What I claim is:

In combination, a bolt having a longitudinal groove, a nut fitted on said bolt and having its inner face toothed, a locking member including a curved body having the inner end directed inwardly and engaged in said groove to lock the member against rotation on said bolt, and having a V-shaped outer end projecting outwardly of the side faces of said nut, and an annular shoulder or enlargement on the inner face of said nut formed inwardly of said teeth to retain the latter in spaced relation to the body of said locking member.

In testimony whereof I affix my signature in presence of two witnesses.

JAMES H. BRUMFIELD.

Witnesses:
C. L. PETERSON,
C. F. PAGE.